United States Patent
Ko et al.

(10) Patent No.: US 10,418,027 B2
(45) Date of Patent: Sep. 17, 2019

(54) ELECTRONIC DEVICE AND METHOD FOR CONTROLLING THE SAME

(71) Applicant: Samsung Electronics Co., Ltd., Suwon-si, Gyeonggi-do (KR)

(72) Inventors: Young-min Ko, Seoul (KR); Jin-geun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 15/782,228

(22) Filed: Oct. 12, 2017

(65) Prior Publication Data

US 2018/0102125 A1 Apr. 12, 2018

(30) Foreign Application Priority Data

Oct. 12, 2016 (KR) ........................ 10-2016-0132331

(51) Int. Cl.
*G10L 15/01* (2013.01)
*G10L 15/04* (2013.01)
*G10L 15/08* (2006.01)

(52) U.S. Cl.
CPC .............. *G10L 15/01* (2013.01); *G10L 15/04* (2013.01); *G10L 15/08* (2013.01)

(58) Field of Classification Search
CPC ....... G10L 25/00; G10L 25/25; G10L 25/265; G10L 25/30
See application file for complete search history.

(56) References Cited

U.S. PATENT DOCUMENTS

| | | | |
|---|---|---|---|
| 6,188,986 B1* | 2/2001 | Matulich | H05B 37/0236 704/275 |
| 9,275,637 B1 | 3/2016 | Salvador | |
| 10,024,711 B1* | 7/2018 | Sanchez | A61B 5/7455 |
| 2014/0006825 A1 | 1/2014 | Shenhav | |
| 2014/0229184 A1* | 8/2014 | Shires | H04L 12/12 704/275 |
| 2014/0358552 A1* | 12/2014 | Xu | G06F 1/3234 704/275 |
| 2015/0154953 A1 | 6/2015 | Bapat et al. | |

(Continued)

FOREIGN PATENT DOCUMENTS

JP 2014-206642 A 10/2014
KR 10-2011-0070688 A 6/2011
(Continued)

*Primary Examiner* — Paras D Shah
(74) *Attorney, Agent, or Firm* — Jefferson IP Law, LLP (57) ABSTRACT

An electronic device is provided, which includes a storage configured to store a voice recognition application including a wakeup word for entering into a voice command recognition mode, a sensor configured to sense a sound signal, and a processor configured to convert the sound signal into a digital signal and to transfer the converted digital signal to the application, wherein the application identifies whether a characteristic value of the digital signal is equal to or higher than a predetermined threshold level if the digital signal is received, performs voice recognition for the digital signal if the characteristic value of the digital signal is equal to or higher than the predetermined threshold level, and activates the voice command recognition mode if a keyword of a voice included in the digital signal coincides with the wakeup word.

19 Claims, 9 Drawing Sheets

(56) References Cited

U.S. PATENT DOCUMENTS

| | | | |
|---|---|---|---|
| 2016/0027439 A1* | 1/2016 | Sharifi | G10L 15/22 704/235 |
| 2016/0055847 A1 | 2/2016 | Dahan | |
| 2016/0077574 A1* | 3/2016 | Bansal | G06F 1/3215 704/275 |
| 2016/0077794 A1* | 3/2016 | Kim | G06F 3/167 704/275 |
| 2016/0171976 A1* | 6/2016 | Sun | H04W 52/0251 704/233 |
| 2017/0148444 A1* | 5/2017 | Bocklet | G10L 17/22 |

FOREIGN PATENT DOCUMENTS

| | | |
|---|---|---|
| KR | 10-2013-0017542 A | 2/2013 |
| KR | 10-1229108 B1 | 2/2013 |
| KR | 10-1317339 B1 | 10/2013 |
| KR | 10-2015-0065521 A | 6/2015 |
| WO | 2014/144579 A1 | 9/2014 |

* cited by examiner

ELECTRONIC DEVICE AND METHOD FOR CONTROLLING THE SAME

CROSS-REFERENCE TO RELATED APPLICATIONS

This application claims priority from Korean Patent Application No. 10-2016-0132331 filed on Oct. 12, 2016 in the Korean Intellectual Property Office, the disclosure of which is incorporated herein by reference in its entirety.

BACKGROUND OF THE INVENTION

Field of the Invention

The present disclosure relates to an electronic device and a method for controlling the same, and more particularly, to an electronic device capable of recognizing voice and a method for controlling the same.
Description of the Related Art Recently, voice recognition functions are installed in various electronic devices. A user can enter into a voice recognition mode of an electronic device by speaking a wakeup word or selecting a voice recognition application on a user interface.

If it is identified that a user has spoken a wakeup word, the electronic device activates a voice recognition application to enter into a voice command recognition mode, and executes a function corresponding to a user's voice command.

In the related art, in order to identify whether a user has spoken a wakeup word, an electronic device should be provided with a separate digital signal processor (DSP) chip.

Since a DSP chip in which a specific wakeup word is registered should be installed in an electronic device in the manufacturing process of the electronic device, a support of a DSP chip manufacturer becomes necessary. Accordingly, development cost is increased, and it is difficult to change the wakeup word.

SUMMARY OF THE INVENTION

Exemplary embodiments of the present disclosure overcome the above disadvantages and other disadvantages not described above, and provide an electronic device, in which an application stores a wakeup word and a similar word of the wakeup word, and performs a wakeup of a voice recognition command mode, and a method for controlling the same.

According to an aspect of the present disclosure, an electronic device includes a storage configured to store a voice recognition application including a wakeup word for entering into a voice command recognition mode; a sensor; and a processor configured to convert a sound signal sensed through the sensor into a digital signal and to transfer the converted digital signal to the application, wherein the application identifies whether a characteristic value of the digital signal is equal to or higher than a predetermined threshold level if the digital signal is received, performs voice recognition for the digital signal if the characteristic value of the digital signal is equal to or higher than the predetermined threshold level, and activates the voice command recognition mode if a keyword of a voice included in the digital signal coincides with the wakeup word.

The characteristic value of the digital signal may be identified on the basis of at least one of a frequency of the digital signal, a decibel, and a length of the sound signal, and the predetermined threshold level may be a level that is set to identify whether the digital signal includes the voice.

The application may store at least one similar word of the wakeup word, identify first similarity between the keyword of the voice and the wakeup word and second similarity between the keyword of the voice and the similar word of the wakeup word, and activate the voice command recognition mode if it is identified that the first similarity is higher than the second similarity.

The application may store a noise extraction algorithm for performing noise filtering and echo canceling, extract a noise of the digital signal using the noise extraction algorithm, and then identify whether the characteristic value of the digital signal from which the noise is extracted is equal to or higher than the predetermined threshold level.

The electronic device according to the aspect of the present disclosure may further include a display, wherein the application provides a UI for at least one of registration and edition of the wakeup word through the display, and stores a text input through the UI as the wakeup word.

The application may automatically create and store a similar word of the updated wakeup word on the basis of at least one of a user's speech history and an external data server if the wakeup word is updated.

The electronic device according to the aspect of the present disclosure may further include a sensor configured to sense a user, wherein the application identifies that the digital signal includes the voice if it is identified that the user is sensed on the basis of the sensing result received from the sensor, and activates the voice command recognition mode if the keyword of the voice included in the digital signal coincides with the wakeup word.

The application may control the predetermined threshold level based on whether the user is sensed on the basis of the sensing result received from the sensor.

According to another aspect of the present disclosure, a method for controlling an electronic device including a storage storing a voice recognition application having a wakeup word for entering into a voice command recognition mode and a processor includes sensing a sound signal; the processor converting the sensed sound signal into a digital signal and transferring the converted digital signal to the application; and the application determining whether a characteristic value of the digital signal is equal to or higher than a predetermined threshold level if the digital signal is received, performing voice recognition for the digital signal if the characteristic value of the digital signal is equal to or higher than the predetermined threshold level, and activating the voice command recognition mode if a keyword of a voice included in the digital signal coincides with the wakeup word.

The characteristic value of the digital signal may be identified on the basis of at least one of a frequency of the digital signal, a decibel, and a length of the sound signal, and the predetermined threshold level may be a level that is set to identify whether the digital signal includes the voice.

The activating the voice command recognition mode may include the application storing at least one similar word of the wakeup word, determining first similarity between the keyword of the voice and the wakeup word and second similarity between the keyword of the voice and the similar word of the wakeup word, and activating the voice command recognition mode if it is identified that the first similarity is higher than the second similarity.

The activating the voice command recognition mode may include the application storing a noise extraction algorithm for performing noise filtering and echo canceling, extracting a noise of the digital signal using the noise extraction algorithm, and then determining whether the characteristic value of the digital signal from which the noise is extracted is equal to or higher than the predetermined threshold level.

The method according to the aspect of the present disclosure may further include the application providing a UI for at least one of registration and edition of the wakeup word, and storing a text input through the UI as the wakeup word.

The method according to the aspect of the present disclosure may further include the application automatically creating and storing a similar word of the updated wakeup word on the basis of at least one of a user's speech history and an external data server if the wakeup word is updated.

The activating the voice command recognition mode may include the application determining that the digital signal includes the voice if it is identified that the user is sensed on the basis of the sensing result received from a sensor, and activating the voice command recognition mode if the keyword of the voice included in the digital signal coincides with the wakeup word.

The method according to the aspect of the present disclosure may further include the application controlling the predetermined threshold level based on whether the user is sensed on the basis of the sensing result received from the sensor.

According to still another aspect of the present disclosure, an electronic device includes a storage configured to store a voice recognition application including a wakeup word for entering into a voice command recognition mode and at least one similar word of the wakeup word; a sensor; and a processor configured to convert a sound signal sensed through the sensor into a digital signal and to transfer the converted digital signal to the application, wherein the application performs voice recognition for the digital signal, identifies first similarity between a keyword of a voice included in the digital signal and the wakeup word and second similarity between the keyword of the voice and a similar word of the wakeup word, and activates the voice command recognition mode if it is identified that the first similarity is higher than the second similarity.

The application may determine whether a characteristic value of the digital signal is equal to or higher than a predetermined threshold level if the digital signal is received, and perform the voice recognition for the digital signal if the characteristic value of the digital signal is equal to or higher than the predetermined threshold level.

The electronic device according to the aspect of the present disclosure may further include a display, wherein the application provides a UI for at least one of registration and edition of the wakeup word through the display, and stores a text input through the UI as the wakeup word.

The application may automatically create and store a similar word of the updated wakeup word on the basis of at least one of a user's speech history and data received from an external data server.

According to the aspects of the present disclosure, it is possible to register and edit the wakeup word stored in the voice recognition application, and the wakeup word recognition rate of the electronic device is heightened.

Additional and/or other aspects and advantages of the disclosure will be set forth in part in the description which follows and, in part, will be obvious from the description, or may be learned by practice of the disclosure.

BRIEF DESCRIPTION OF THE DRAWING FIGURES

The above and/or other aspects of the present disclosure will be more apparent by describing certain exemplary embodiments of the present disclosure with reference to the accompanying drawings, in which.

DETAILED DESCRIPTION OF THE EXEMPLARY EMBODIMENTS

Hereinafter, embodiments of the present disclosure will be described in more detail with reference to the accompanying drawings.

Figure 1A:
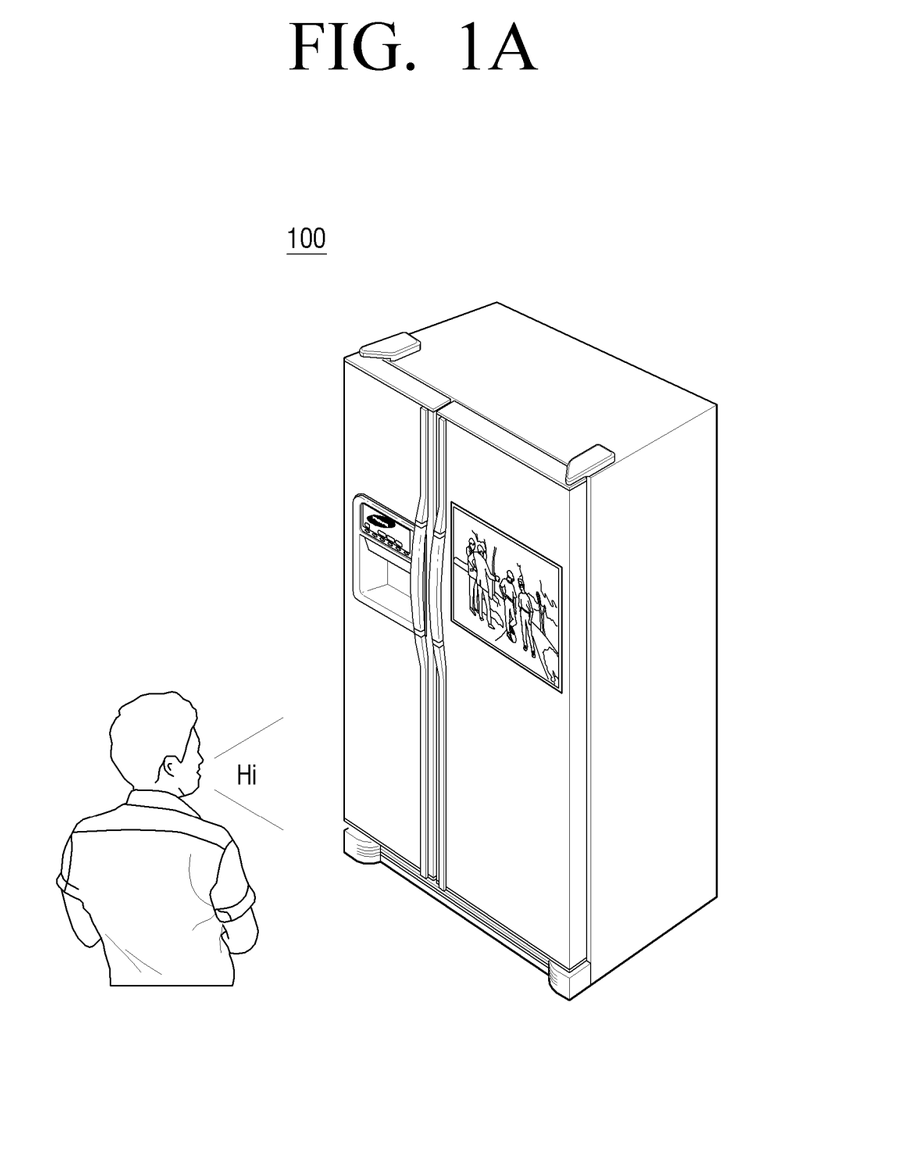
FIGS. 1A and 1B are diagrams explaining an operation of activating a voice command recognition mode using a wakeup word according to an embodiment of the present disclosure.
Figure 1B:
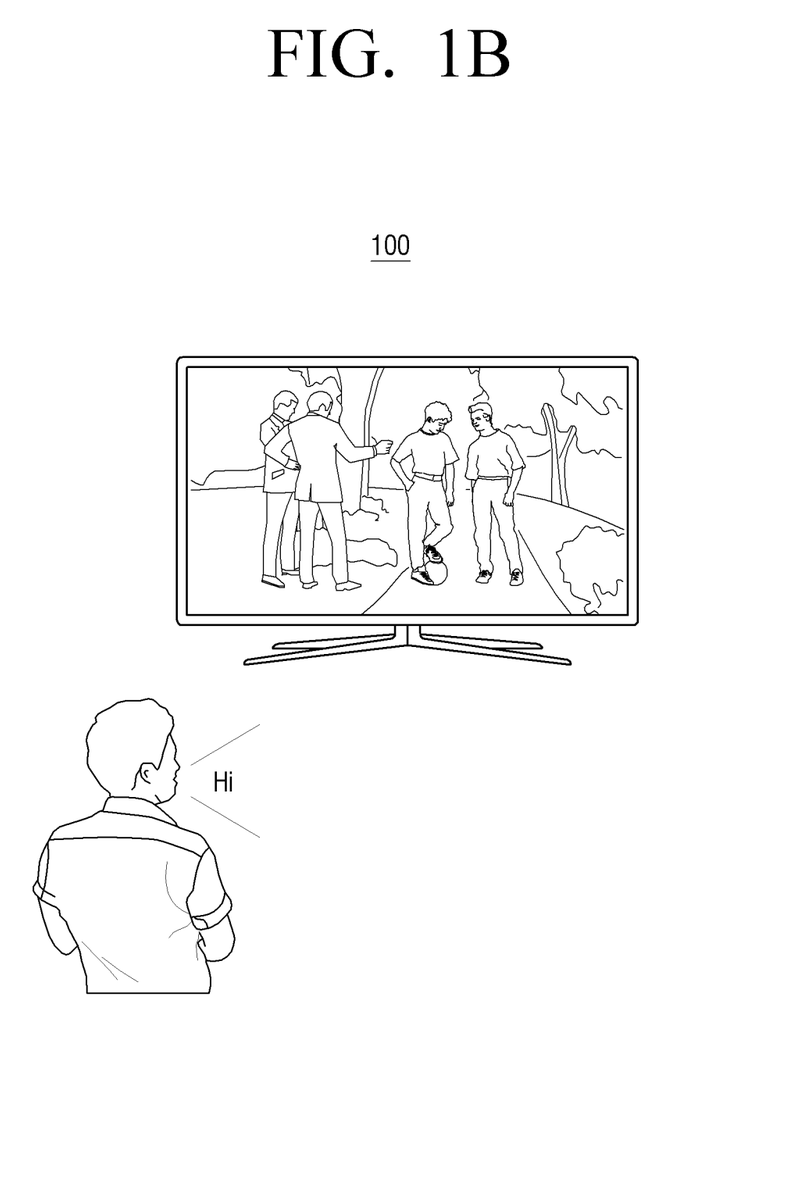

FIGS. 1A and 1B are diagrams explaining an operation of activating a voice command recognition mode using a wakeup word according to an embodiment of the present disclosure.

FIG. 1A is a diagram exemplarily explaining a case where an electronic device 100 senses user's speech voice. Although FIG. 1A illustrates a refrigerator as the electronic device 100, this is merely exemplary, and the electronic device 100 may be implemented by various electronic devices having voice recognition functions, such as a portable phone, a tablet PC, a digital camera, and air conditioner.

The electronic device 100 may include a sensor (not illustrated) configured to sense user's speech voice. For example, the sensor may be implemented by a microphone that senses the user's speech voice. Further, the electronic device 100 may convert the voice that is received through the microphone into a digital signal, and may perform voice recognition for the digital signal using a pre-stored voice recognition application.

Specifically, the voice recognition application may identify whether the digital signal coincides with a wakeup word through analysis of the digital signal. Here, the wakeup word is a word for activating a voice command recognition mode for controlling the electronic device 100 on the basis of a user's voice command, and may be a predetermined word. If it is identified that the received voice coincides with the wakeup word, the electronic device 100 may operate to activate the voice command recognition mode of the voice recognition application.

The voice recognition command mode is a mode in which the electronic device 100 recognizes the user's speech voice and performs a corresponding function. For example, in the voice recognition command mode, the electronic device 100 may analyze the user's speech voice and may execute a function that is mapped on a specific keyword included in the speech voice.

FIG. 1B illustrates a case where the electronic device 100 is implemented by a display device according to an embodiment of the present disclosure. As described above, if the user's speech voice is received, the electronic device 100 may convert the received voice into a digital signal, and may perform voice recognition for the digital signal using the pre-stored voice recognition application.

Hereinafter, various embodiments for activating the voice recognition command mode using the pre-stored application as described above will be described.

Figure 2:
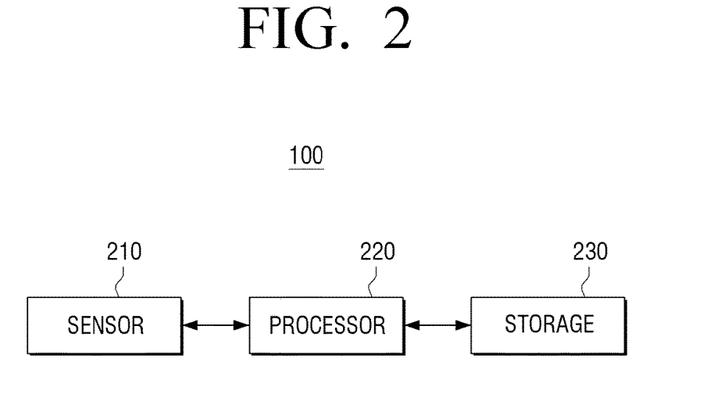
FIG. 2 is a block diagram schematically illustrating the configuration of an electronic device according to an embodiment of the present disclosure.

FIG. 2 is a block diagram schematically illustrating the configuration of an electronic device 100 according to an embodiment of the present disclosure. As illustrated in FIG. 2, an electronic device 100 includes a sensor 210, a processor 220, and a storage 230.

The sensor 210 is a constituent element for sensing a sound signal. For example, the sensor 210 may be implemented in the form capable of sensing a sound signal, such as a microphone. The microphone may be one constituent element of the electronic device 100, bur may be provided in an external device, such as a remote controller (not illustrated) for controlling the electronic device 100.

The processor 220 is a constituent element for controlling the overall operation of the electronic device 100. In particular, the processor 220 may convert the sound signal that is received through the sensor 210 into a digital signal, and may transfer the converted digital signal to the voice recognition application. Here, the processor 220 may be implemented by a digital signal processor (DSP) or a SoC having a built-in content processing algorithm, or in a field programmable gate array (FPGA) form. Further, the processor 220 may include one or more of a central processing unit (CPU), a controller, an application processor (AP), a communication processor (CP), and an ARM processor, or may be defined by corresponding terms.

The storage 230 may store therein control programs for controlling the electronic device 100 and the processor 220, applications initially provided by a manufacturer or downloaded from outside, a graphical user interface (hereinafter referred to as "GUI") related to the applications, objects (e.g., image texts, icons, and buttons) for providing the GUI, user information, documents, databases, and related data.

In particular, the storage 230 may include a voice recognition application and a wakeup word for entering into the voice command recognition mode. Here, the voice recognition application may be an application configured to analyze and convert the user's speech voice into character data. The user's speech voice may be converted into the digital signal by the processor 220, and the digital signal may be converted into character data by the voice recognition application.

On the other hand, the voice recognition application may include a first step of determining whether the digital signal received from the processor 220 is a human voice and a second step of determining whether the user's speech voice includes the wakeup word.

The voice recognition application may identify the user's speech voice by determining whether the characteristic value of the digital signal received from the processor 220 is equal to or higher than a predetermined threshold level. Here, the characteristic value of the digital signal may be identified on the basis of at least one of a frequency of the digital signal, a decibel, and a length of the sound signal.

According to an embodiment, if the characteristic value of the digital signal is equal to or higher than a predetermined first threshold level, the voice recognition application identifies that the corresponding digital signal includes a signal related to the user's voice, that is, the user's speech voice is included in the sound signal received by the sensor 210. Here, the first threshold level may be identified on the basis of an average decibel (dB) and an average frequency of the human voice.

According to another embodiment, if the characteristic value of the digital signal is equal to or higher than a predetermined second threshold level, the voice recognition application may identify that the corresponding digital signal includes the signal related to the user's voice, that is, the sound signal received by the sensor 210 includes the user's speech voice. Here, the second threshold level may be identified on the basis of an average decibel (dB) and an average frequency of the human voice, and the characteristic of the wakeup word.

The characteristic of the wakeup word is identified on the basis of a phoneme and a syllable of the wakeup word, and a length of the speech voice when a human speaks the wakeup word. Accordingly, if it is identified that the digital signal that the voice recognition application receives from the processor 220 is equal to or higher than the second threshold level, the user's speech voice included in the digital signal may have similarity that is equal to or higher than a predetermined value with respect to the wakeup word. For example, if it is identified that the second threshold level is 5,000 and the characteristic value of the digital signal is equal to or larger than 5,000, it may be identified that the user's speech voice is included in the sound signal received by the sensor 210. Further, it may be identified that the user's speech voice has similarity that is equal to or higher than the predetermined value with respect to the wakeup word.

According to another embodiment, if the length of the sound signal received by the sensor 210 is included in a predetermined range of the length of the speech voice when the user speaks the wakeup word, the voice recognition application may identify that the characteristic value of the digital signal is equal to or higher than the threshold level.

If the characteristic value of the digital signal is equal to or higher than the predetermined threshold level, the voice recognition application may perform the voice recognition for the digital signal. Accordingly, the voice recognition application extracts a keyword of the voice included in the digital signal. The keyword of the voice is a text that corresponds to the digital signal, and the voice recognition application may extract the keyword by converting the digital signal received from the processor 220 into a text.

The voice recognition application may identify whether the keyword coincides with the pre-stored wakeup word. Further, if it is identified that the similarity between the keyword and the pre-stored wakeup word is equal to or higher than the predetermined similarity, the voice recognition application may identify that the keyword coincides with the pre-stored wakeup word. If it is identified that the keyword coincides with the wakeup word, the voice recognition application may activate the voice command recognition mode.

According to another embodiment of the present disclosure, the voice recognition application performs the voice recognition for the digital signal, and identifies the first similarity between the keyword of the voice included in the digital signal and the wakeup word. If it is identified that the first similarity is equal to or higher than the predetermined value, the voice recognition application may activate the voice command recognition mode.

On the other hand, the wakeup word may be a word that activates the voice recognition command mode by executing an application or software for performing the voice command recognition mode for controlling the electronic device 100 through the voice. If the function for performing the voice command recognition mode is implemented in the form of an application, it may be implemented by the same application as the voice recognition application for recognizing the wakeup word, or may be implemented by a separate application. If the function for performing the voice command recognition mode is implemented in the form of software, it may be implemented by software stored in the voice recognition application that recognizes the wakeup word according to an embodiment of the present disclosure, or may be implemented in the form of software stored in a separate memory.

Further, the voice recognition application may store therein at least one similar word of the wakeup word. The similar word of the wakeup word may be a word having a similar characteristic to that of the wakeup word. For example, the voice recognition application may store a word having the same phoneme and syllable as those of the wakeup word as the similar word. Further, the voice recognition application may store a word having the predetermined similarity of the wakeup word as the similar word.

According to another embodiment of the present disclosure, the voice recognition application may identify the first similarity between the keyword and the wakeup word and the second similarity between the keyword and the pre-stored similar word by extracting the keyword included in the digital signal. If it is identified that the similarity (first similarity) between the keyword and the wakeup word is the highest on the basis of the first similarity and the second similarity, the voice recognition application may activate the voice command recognition mode.

According to another embodiment of the present disclosure, the voice recognition application may store a noise extraction algorithm for performing noise filtering and echo canceling. The voice recognition application may extract a noise by applying the noise extraction algorithm to the digital signal received from the processor 220, and then may identify whether the characteristic value of the digital signal from which the noise is extracted is equal to or higher than the threshold level.

On the other hand, the electronic device may be provided with a display (not illustrated). The display is a constituent element for displaying various kinds of images and UIs. For example, the display may display content from a network interface and an application stored in the storage 230.

Further, the display may display a UI for at least one of registration and edition of the wakeup word. In particular, the display may display a UI for receiving an input of the wakeup word as a text or a UI for receiving an input of the wakeup word as a voice. For example, the display may display a user's speech voice or a word input through a virtual keyboard on the UI. The voice recognition application may store the displayed word as the wakeup word, and may update the wakeup word stored in the voice recognition application.

Further, the display may display a UI for at least one of registration and edition of a similar word of the wakeup word. The voice recognition application may store a word included in the user's speech voice or a word input as a text through the UI as the similar word of the wakeup word.

According to another embodiment of the present disclosure, the voice recognition application may receive a similar word of a wakeup word from an external data server. The received similar word of the wakeup word may be stored in the voice recognition application and may be used to identify similarity to the keyword of the voice included in the digital signal.

On the other hand, the voice recognition application may store a user's speech history. The voice recognition application may automatically create and store a similar word of the wakeup word on the basis of the stored user's speech history.

The user's speech history may be a keyword history of the voice included in the digital signal that is converted by the processor 220. The voice recognition application may store the text corresponding to the digital signal in the user's speech history. Further, the keyword that is identified not to coincide with the wakeup word after it is identified that the characteristic value of the digital signal is equal to or higher than the predetermined threshold level may be stored in the user's speech history. For example, the voice recognition application identifies that the characteristic value of the digital signal is equal to or higher than the predetermined threshold level, and if the keyword of the voice included in the digital signal does not coincide with the wakeup word, the keyword is stored in the user's speech history. The voice recognition application may automatically create and store a similar word of the wakeup word on the basis of the user's speech history. On the other hand, the generated similar word may be used to identify the similarity to the keyword of the voice included in the digital signal that is transferred by the processor 220.

Further, if the wakeup word is updated, the voice recognition application automatically create and store a similar word of the updated wakeup word on the basis of at least one of the user's speech history and an external data server, but is not limited thereto. The voice recognition application may automatically create and store the similar word of the wakeup word on the basis of data received from the external data server regardless of whether the wakeup word is updated.

Further, the electronic device 100 may be provided with a sensor configured to sense a user. The sensor for sensing the user may be implemented by a motion sensor. The motion sensor is provided in one direction of the electronic device 100 to sense a motion in a predetermined range and to transfer the sensing result to the voice recognition application.

According to another embodiment of the present disclosure, the sensor for sensing the user may be implemented by a human body sensor. The human body sensor may sense existence/nonexistence of a person in a predetermined range around the electronic device 100, and may transfer the sensing result to the voice recognition application.

On the other hand, the predetermined range may be a sensing range of the sensor for sensing the user, or the range may be re-determined within the sensing range by the user.

If it is identified that the user exists within the predetermined range around the electronic device 100 on the basis of the sensing result that is received from the sensor for sensing the user, the voice recognition application identifies that the digital signal includes the user's speech voice. For example, if the digital signal is received from the processor 220 in a state where the application has received the sensing result that the user exists around the electronic device 100 from the sensor for sensing the user, the voice recognition application identifies that the received digital signal includes the user's speech voice. Accordingly, the voice recognition application may identify only whether the keyword of the voice included in the digital signal coincides with the pre-stored wakeup word while omitting the determination of whether the characteristic value of the digital signal is equal to or higher than the predetermined threshold level.

According to another embodiment of the present disclosure, if the voice recognition application receives the sensing result that the user exists within the predetermined range around the electronic device 100 from the sensor for sensing the user, the application may re-identify the threshold level. For example, through the redetermination of the threshold level, the voice recognition application may identify that the digital signal includes the user's speech voice even if the digital signal having the threshold level that is lower than the existing threshold level is received from the processor 220. Since the predetermined threshold level may be identified on the basis of at least one of an average decibel (dB) and an average frequency of the human voice, and the characteristic of the wakeup word, and the characteristic value of the digital signal may be identified on the basis of at least one of a decibel (dB) and a frequency of the user's speech voice, and the characteristic of the keyword, the application can identify whether the keyword of the voice included in the digital signal coincides with the wakeup word even if the sound signal sensed by the sensor 210 is inaccurate, and thus the characteristic value of the digital signal received from the processor 220 is lower than the predetermined threshold level.

On the other hand, the characteristic of the keyword included in the user's speech voice is identified on the basis of the phoneme and the syllable of the keyword. Further, the case where the sound signal is inaccurate may be a case where the decibel of the user's speech voice is lower than the average decibel or a case where user's pronunciation is inaccurate.

Hereinafter, a method for the voice recognition application to identify whether the voice keyword and the wakeup word coincide with each other as described above will be described.

Figure 3:
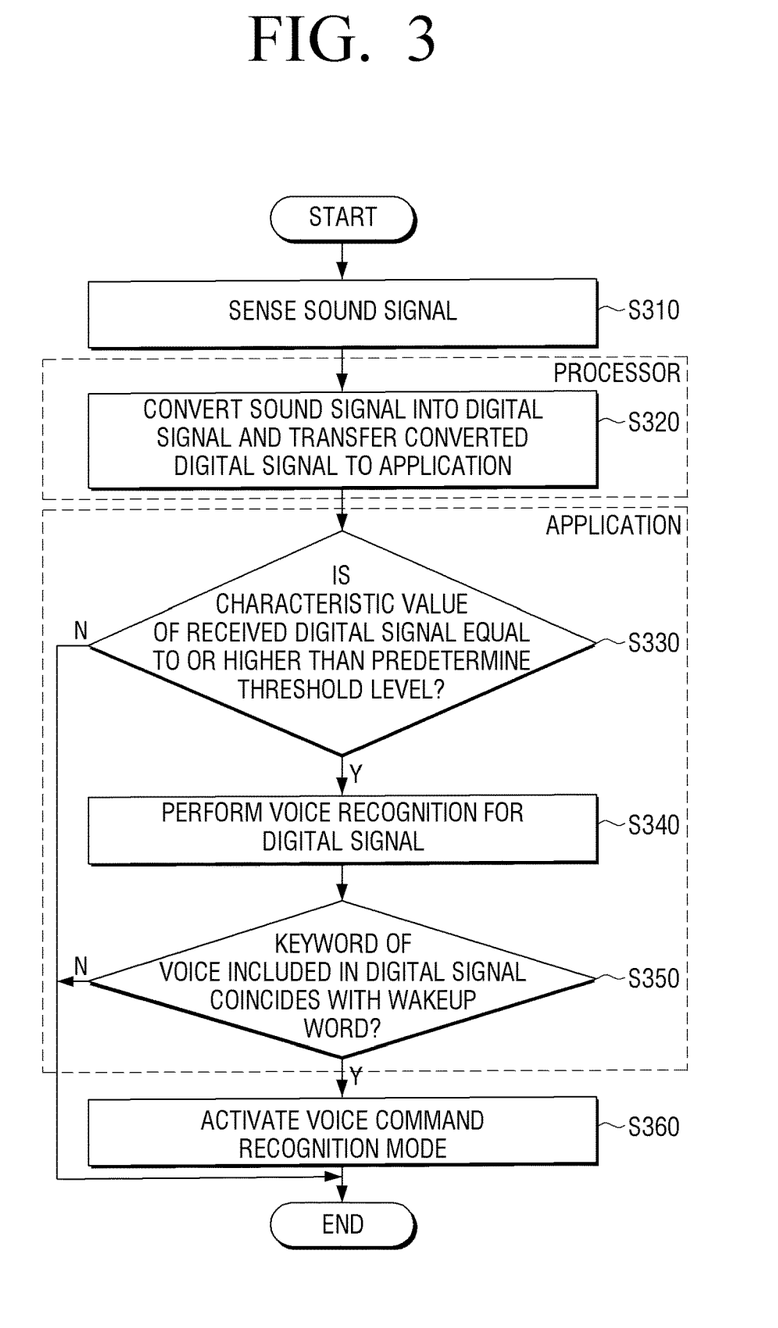
FIG. 3 is a flowchart explaining a method for a voice recognition application to identify a wakeup word according to an embodiment of the present disclosure.

FIG. 3 is a flowchart explaining a method for a voice recognition application to identify a wakeup word according to an embodiment of the present disclosure.

According to a method for controlling an electronic device 100 including a storage storing a voice recognition application having a wakeup word for entering into a voice command recognition mode and a processor, the electronic device 100 may sense a sound signal (S310).

Here, the processor 220 may convert the sensed sound signal into a digital signal to transfer the converted digital signal to the voice recognition application (S320).

The voice recognition application stored in the storage 230 may identify whether a characteristic value of the digital signal transferred from the processor 220 is equal to or higher than a predetermined threshold level (S330: Y). If the characteristic value of the digital signal is equal to or higher than the predetermined threshold level, the voice recognition application may perform voice recognition for the digital signal (S340).

Further, the voice recognition application may identify whether a keyword of a voice included in the digital signal coincides with a wakeup signal pre-stored in the voice recognition application, and if the keyword coincides with the wakeup signal, the voice recognition application may activate a voice command recognition mode.

On the other hand, if the voice recognition application identifies that the characteristic value of the received digital signal is lower than the predetermined threshold level (S330: N), it may identify the sensed sound signal as a noise.

Further, if the voice recognition application identifies that the keyword of the voice included in the digital signal does not coincide with the wakeup word (S350: N), the voice command recognition mode may not be activated.

On the other hand, the voice recognition application may store a noise extraction algorithm for performing noise filtering and echo canceling. Accordingly, if the processor 220 converts the sound signal into the digital signal to transfer the converted digital signal to the application (S320), the voice recognition application may extract the noise (not illustrated) included in the received digital signal using the noise extraction algorithm, and then may identify whether the characteristic value of the digital signal from which the noise is extracted is equal to or higher than the predetermined threshold level (S330).

Hereinafter, a method for the voice recognition application to identify whether the keyword coincides with the wakeup word through determination of similarity between the keyword and a similar word of the wakeup word will be described.

Figure 4:
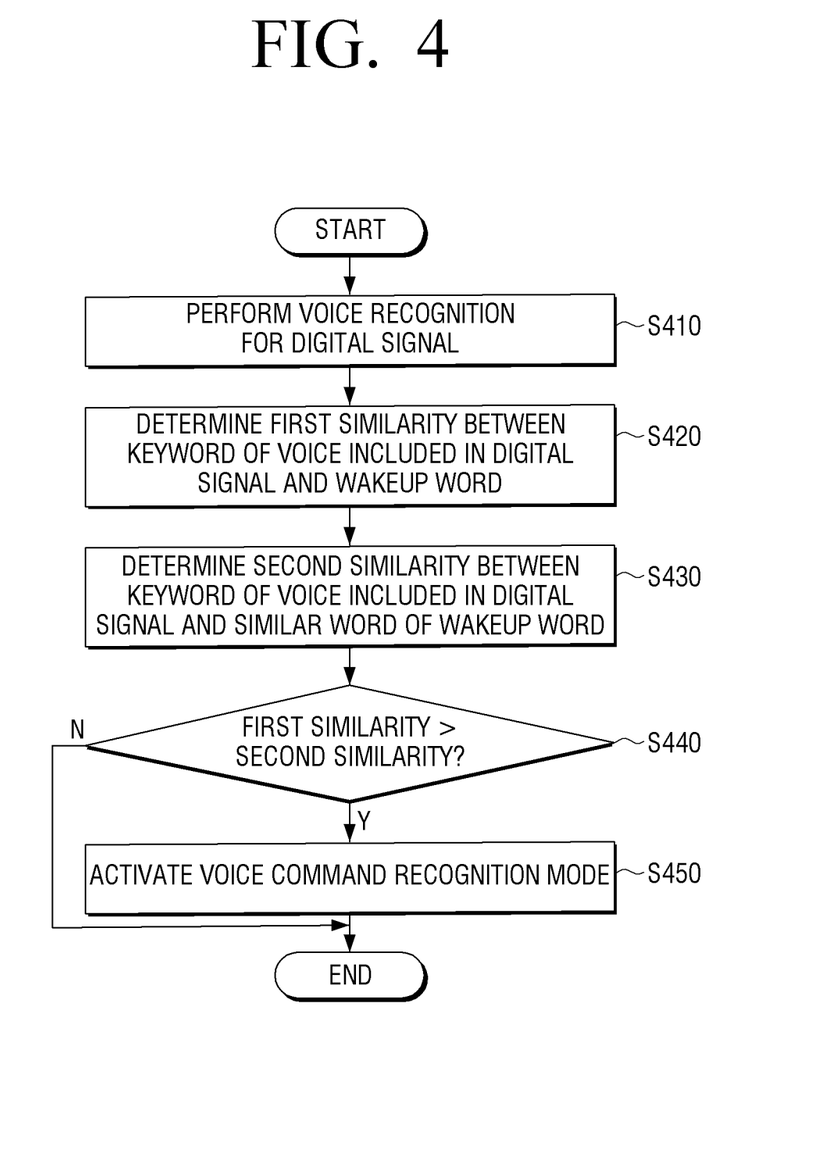
FIG. 4 is a flowchart explaining a method for activating a voice command recognition mode according to an embodiment of the present disclosure.

FIG. 4 is a flowchart explaining a method for activating a voice command recognition mode according to an embodiment of the present disclosure.

As described above, if it is identified that the characteristic value of a received digital signal is equal to or higher than a predetermined threshold level (S330: Y), a voice recognition application may perform voice recognition for the digital signal (S410).

Further, the voice recognition application may identify a first similarity between a keyword of a voice included in the digital signal and a wakeup word pre-stored in the voice recognition application (S420).

Further, the voice recognition application may identify a second similarity between the keyword of the voice included in the digital signal and a similar word of the wakeup word (S430).

If it is identified that the first similarity is higher than the second similarity on the basis of the first similarity and the second similarity (S440: Y), the voice recognition application may identify that a sensed sound signal includes the wakeup word, and may activate a voice command recognition mode (S450).

On the other hand, if it is identified that the first similarity is not higher than the second similarity (S440: N), the voice recognition application may not activate the voice command recognition mode.

As described above, similar words of the wakeup word may be automatically generated and stored in the voice recognition application. The voice recognition application may receive the similar words of the wakeup word from an external data server using a network interface provided in the electronic device 100 to store the received similar words. Further, the voice recognition application may automatically generate and store similar words of the wakeup word on the basis of a user's speech history.

On the other hand, the voice recognition application may display a UI for at least one of registration and edition of the similar word, and may generate the similar word of the wakeup word on the basis of a word included in the user's speech voice or a word input as a text through the UI.

Hereinafter, a method for activating a voice command recognition mode of the voice recognition application will be described.

Figure 5A:
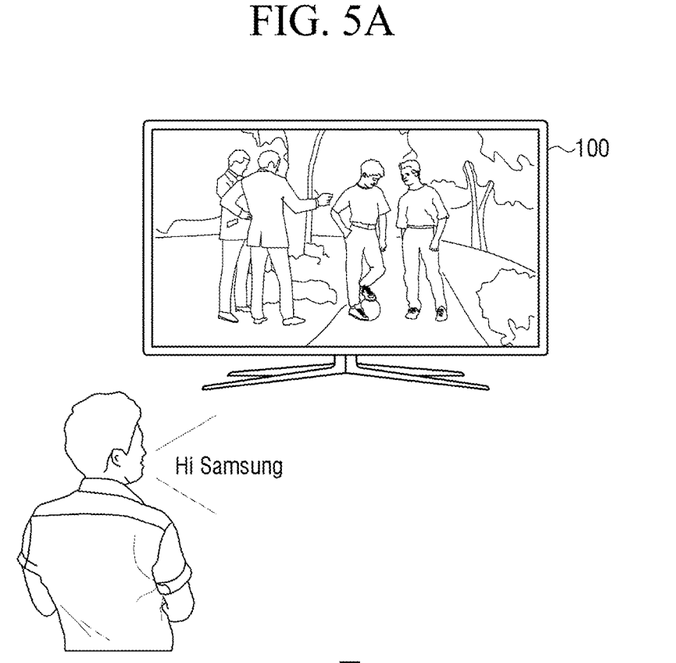
FIGS. 5A and 5B are diagrams explaining an operation of activating a voice command recognition mode using a wakeup word according to an embodiment of the present disclosure.
Figure 5B:
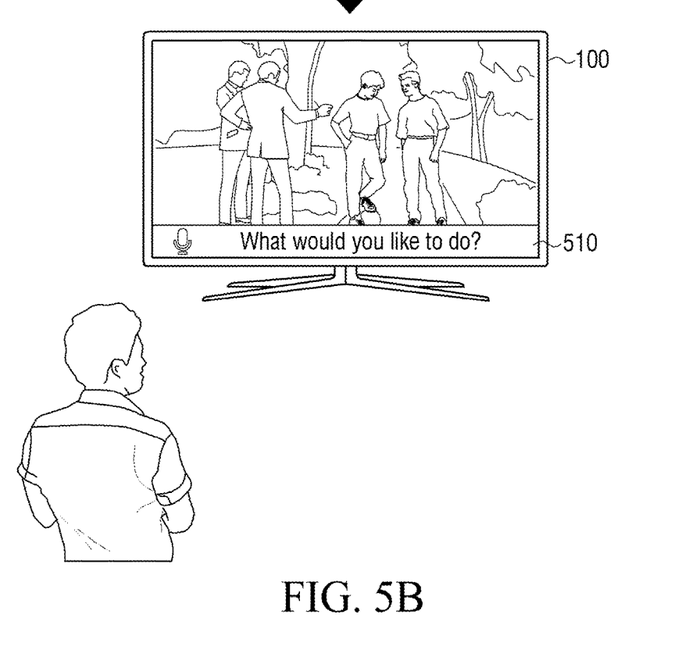

FIGS. 5A and 5B are diagrams explaining an operation of activating a voice command recognition mode using a wakeup word according to an embodiment of the present disclosure.

Referring to FIG. 5A, a sensor 210 provided on an electronic device 100 may sense a sound signal. Accordingly, the sensor 210 may sense a sound signal that corresponds to user's speech voice of a wakeup word. The sensor 210 is a voice recognition module, and may sense the sound signal around the electronic device 100. Further, the sensor 210 may sense only the sound signal within a predetermined range of the electronic device 100.

On the other hand, the wakeup word is a word for activating a voice command recognition mode, and may be a predetermined word. For example, the sensor 210 may sense the sound signal, and the sensed sound signal may be transferred to the processor 220. The processor 220 converts the sound signal into a digital signal, and transfers the converted digital signal to a voice recognition application. The voice recognition application identifies whether the converted digital signal is equal to or higher than a predetermined threshold level.

In an embodiment of the present disclosure, as shown in FIG. 5A, the predetermined wakeup word may be "Hi Samsung", and the sensor 210 may sense and transfer the user's speech sound to a processor 220. The processor 220 may convert an analog signal "Hi Samsung" into a digital signal. The converted digital signal may have a characteristic value. Here, the characteristic value of the digital signal may be identified on the basis of at least one of a decibel (dB) of the user's speech voice sensed by the sensor 210, a frequency, and the characteristic of a keyword included in the speech voice. On the other hand, the characteristic of the keyword included in the user's speech voice may be identified on the basis of a phoneme and a syllable of the keyword. For example, the characteristic value of the digital signal may be identified on the basis of the phoneme and the syllable of "Hi Samsung", and the decibel and the frequency of the user's speech voice "Hi Samsung" that is sensed by the sensor 210.

The predetermined threshold level may mean a characteristic value of the digital signal when the wakeup word is spoken at an average decibel and an average frequency of human voices. The average decibel is a decibel of a general human speech voice, and may be set to about 60 decibels. The average frequency is a frequency of a general human speech voice, and may be set to a frequency of 200 to 3,500 Hz, but is not limited thereto. The voice recognition application may re-identify the threshold level on the basis of the decibel and the frequency set by a user's input.

On the other hand, if it is identified that the characteristic value of the digital signal is equal to or higher than the predetermined level, the voice recognition application may perform voice recognition for the digital signal. The voice recognition for the digital signal may be a process of extracting the keyword included in the digital signal. For example, if the characteristic value of the digital signal received from the processor 220 is equal to or higher than the predetermined threshold value and thus it is identified that the digital signal includes the user's speech voice, the voice recognition application may convert the digital signal into a text to extract a word.

Further, the voice recognition application may identify whether the extracted word coincides with the predetermined wakeup word. The voice recognition application may identify whether the similarity between the keyword of the voice and the wakeup word is equal to or higher than the predetermined similarity, and if the similarity is equal to or higher than the predetermined similarity, the voice recognition application may identify that the keyword coincides with the wakeup word. The predetermined similarity is to lower the misrecognition rate of the determination of whether a user has spoken the wakeup word, and may be re-determined by the user.

In an embodiment of the present disclosure, as illustrated in FIG. 5B, if it is identified that the keyword of the voice included in the digital signal coincides with the predetermined wakeup word, the voice recognition application may activate the voice command recognition mode. If the voice command recognition mode is activated, the voice recognition application may display a specific phrase 510 notifying that the voice command recognition mode has been activated. The voice command recognition mode may be a state where the electronic device 100 can perform a function corresponding to the user's speech voice. On the other hand, if the voice command recognition mode is activated, the specific phrase 510 may be displayed, and specific sound may be output through a speaker (not illustrated) provided in the electronic device 100.

Hereinafter, a user interface for registering and editing a wakeup word in a voice recognition application will be described.

Figure 6A:
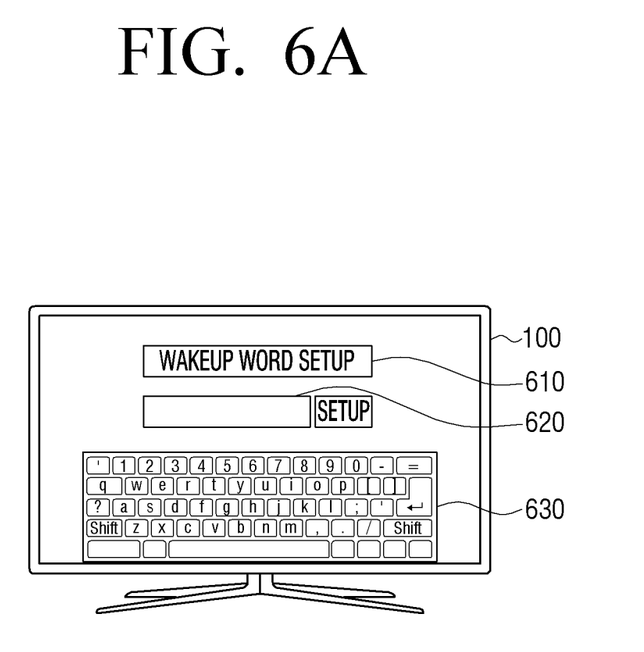
FIGS. 6A and 6B are diagrams explaining a user interface for registering and editing a new wakeup word according to an embodiment of the present disclosure.
Figure 6B:
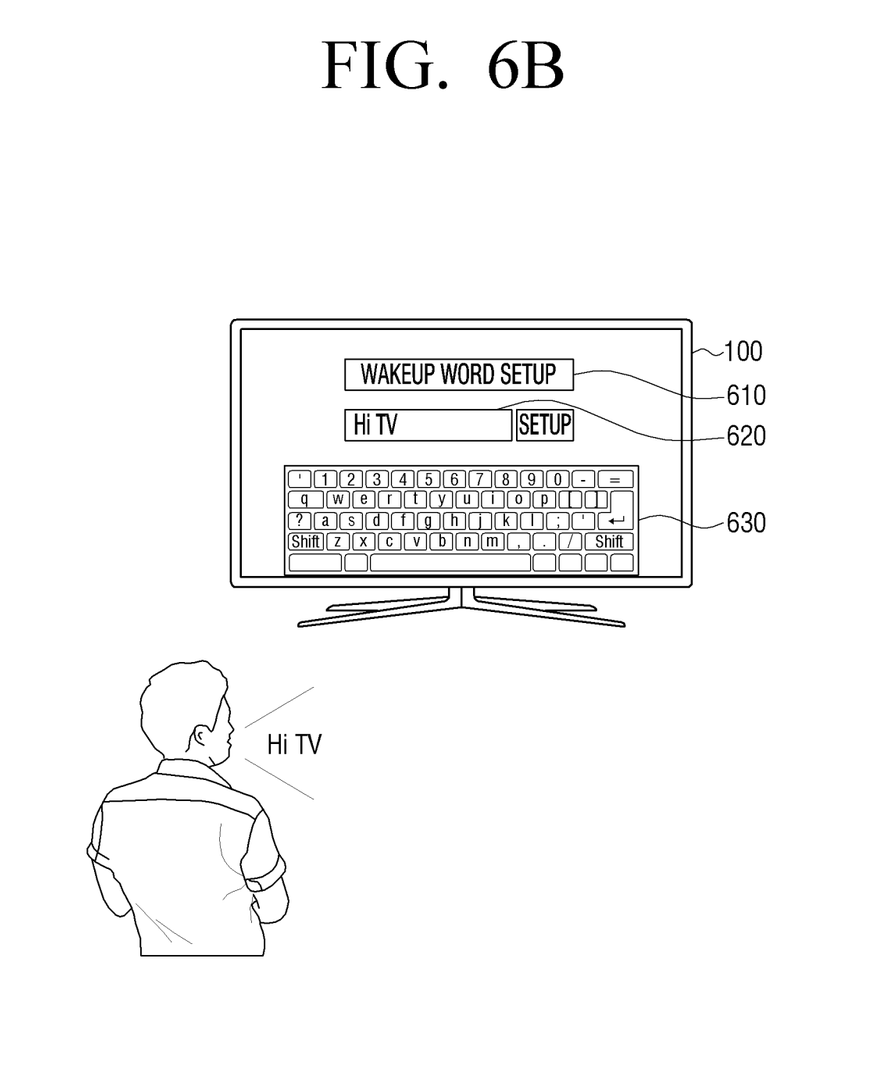

FIGS. 6A and 6B are diagrams explaining a user interface for registering and editing a new wakeup word according to an embodiment of the present disclosure.

Referring to FIG. 6A, a voice recognition application may provide a UI 610 for registering and editing a wakeup word. The wakeup word that is stored in the voice recognition application may be registered and edited using the UI provided through a display.

The voice recognition application may set a word input through the UI as a wakeup word (620), and may store the set wakeup word in the application.

FIG. 6B is a diagram illustrating a UI for setting a wakeup word and a wakeup word that is newly recognized on the basis of a user's speech.

In a state where a wakeup word setup UI 610 is displayed, a keyword included in user's speech voice or a keyword input using a keyword or a virtual keyboard 630 is displayed on a text window 620. For example, on the text window, a word sensed by a sensor 210 corresponding to the user's speech voice or a word input through the UI may be displayed. On the other hand, the word that is displayed on the text window 620 may be stored in the voice recognition application to be used as a wakeup word of the voice recognition application.

In another embodiment of the present disclosure, the display provided on the electronic device 100 may be implemented by a touch screen. Accordingly, the wakeup word setup UI 610 may be displayed together with the virtual keyboard 630, and a word corresponding to an input through the virtual keyboard 630 may be displayed on the text window 620.

On the other hand, the voice recognition application may provide a UI for registering and editing a similar word of the wakeup word. The voice recognition application may display a similar word through analysis of the user's speech voice, and the displayed similar word may be stored in the voice recognition application. Further, the voice recognition application may recognize the input word using a touch screen provided on the electronic device 100 or an external device, and may store the recognized word as a similar word of the wakeup word. The stored similar word may be used for determination of the similarity with the keyword of the voice included in the digital signal. Accordingly, the first similarity between the keyword of the voice included in the digital signal and the wakeup word may be determined, and the second similarity between a newly stored similar word and the keyword may be determined. If the first similarity is higher than the second similarity, the voice command recognition mode of the electronic device 100 may be activated.

Hereinafter, a method for activating a voice command recognition mode on the basis of the sensing result of a sensor for sensing a user will be described.

Figure 7A:
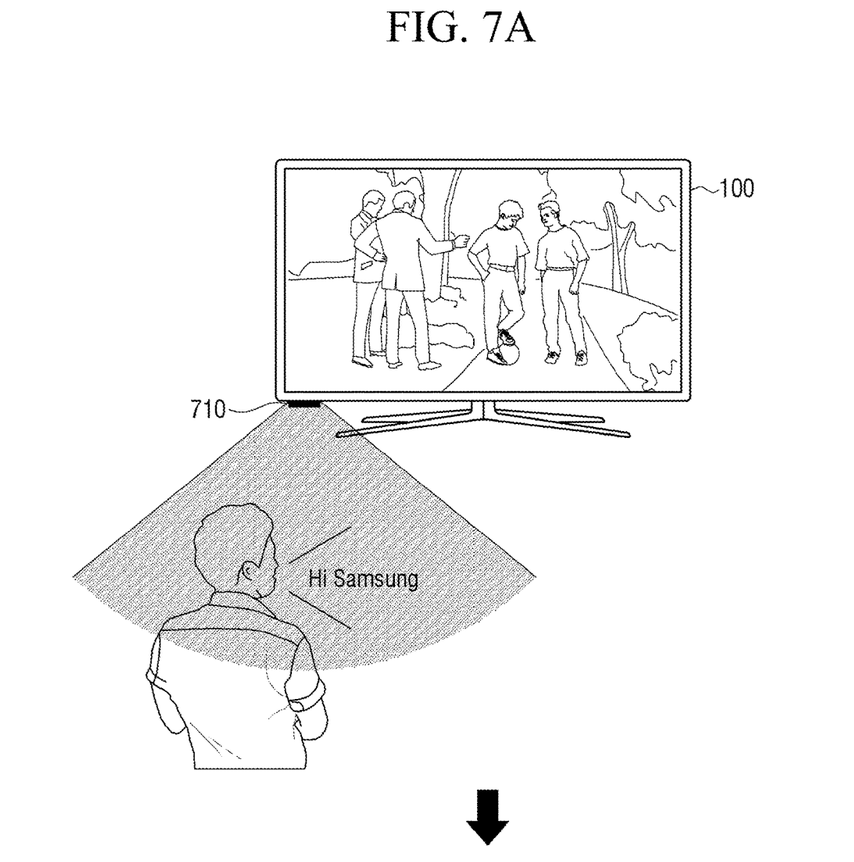
FIGS. 7A and 7B are diagrams explaining an electronic device provided with a sensor for sensing a user and an operation of activating a voice command recognition mode using the sensor for sensing a user according to an embodiment of the present disclosure.
Figure 7B:
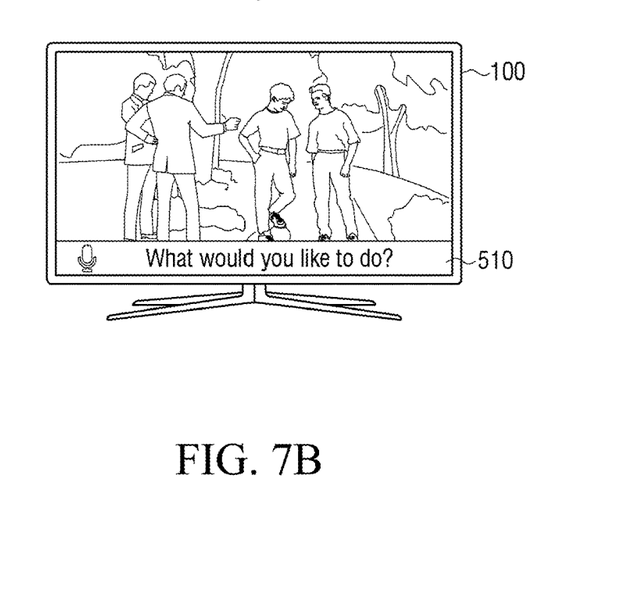

FIGS. 7A and 7B are diagrams explaining an electronic device provided with a sensor for sensing a user and an operation of activating a voice command recognition mode using the sensor for sensing a user according to an embodiment of the present disclosure.

An electronic device 100 may be provided with a sensor 710 for sensing a user. The sensor 710 for sensing a user may be implemented by a human body sensor, a motion sensor, or a temperature sensor, but is not limited thereto.

The sensor 710 for sensing a user may be provided in one direction of the electronic device 100 to sense whether a human exists in a predetermine range. The predetermined range may be a range in which the sensor 710 can sense a user or a range set by the user.

On the other hand, the sensor 710 for sensing a user may transfer the sensing result to the voice recognition application. If it is identified that the user exists within a predetermined range around the electronic device 100 on the basis of the sensing result received from the sensor 710, the voice recognition application may re-identify the threshold level.

The threshold level is based on at least one of an average decibel and an average frequency of the human voice, and the characteristic of the wakeup word, and as the threshold level is re-determined, the voice recognition application can perform voice recognition for the digital signal even if the user's speech voice secedes from the average decibel and the average frequency, and the characteristic of the wakeup word.

For example, if it is identified that the user exists within the predetermined range around the electronic device 100 on the basis of the human body sensing result received from the sensor 710, the voice recognition application may re-identify the threshold level so that the threshold level becomes lower than the existing threshold level. Accordingly, even if the user's speech voice is lower than the average decibel, the voice recognition application can identify whether the keyword included in the digital signal coincides with the wakeup word.

According to another embodiment of the present disclosure, if the sensor 710 for sensing the user is unable to sense the user within the predetermined range around the electronic device 100, the voice recognition application may identify the threshold level so that the threshold level becomes higher than the existing threshold level. Accordingly, although the user's speech voice corresponds to the average decibel, the voice recognition application may not identify whether the keyword included in the digital signal coincides with the wakeup word.

However, this is merely exemplary, and the change of the threshold level on the basis of the sensing result of the sensor 710 for sensing the user may also be applied in an opposite manner.

According to another embodiment of the present disclosure, the voice recognition application may omit the process of determining whether the characteristic value of the digital signal is equal to or higher than the threshold level depending on the sensing result received from the sensor 710 for sensing the user. For example, if it is identified that the user exists within the predetermined range around the electronic device 100, the application may perform the voice recognition, and may identify whether the keyword of the voice included in the digital signal coincides with the wakeup word.

On the other hand, the methods according to the various embodiments of the present disclosure as described above may be implemented only by software/hardware upgrade for the existing electronic device 100.

Further, it is also possible that the various embodiments of the present disclosure as described above are performed through an embedded server provided in the electronic device 100 or an external server of the electronic device 100.

Further, a non-transitory computer readable medium may be provided, in which a program for successively performing the control method according to the present disclosure is stored.

The non-transitory computer readable medium is not a medium that stores data for a short period, such as a register, a cache, or a memory, but means a medium which semi-permanently stores data and is readable by a device. Specifically, various applications and programs as described above may be stored and provided in the non-transitory computer readable medium, such as, a CD, a DVD, a hard disc, a Blu-ray disc, a USB, a memory card, and a ROM.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:
1. An electronic device comprising:
   a storage configured to store a wakeup word for entering into a voice command recognition mode;
   a sensor; and
   at least one processor configured to:
      convert a sound signal sensed through the sensor into a digital signal,
      identify whether a characteristic value of the digital signal is equal to or higher than a predetermined threshold level if the digital signal is received, the characteristic value of the digital signal being identified on the basis of an average frequency and an average decibel of the digital signal,
      perform voice recognition for the digital signal if the characteristic value of the digital signal is equal to or higher than the predetermined threshold level, and
      activate the voice command recognition mode if a keyword of a voice included in the digital signal coincides with the wakeup word.
2. The electronic device as claimed in claim 1, wherein the characteristic value of the digital signal is further identified on the basis of a length of the sound signal, and
   wherein the predetermined threshold level is a level that is set to identify whether the digital signal includes the voice.
3. The electronic device as claimed in claim 1, wherein the at least one processor is further configured to:
   store at least one similar word of the wakeup word, identify a first similarity between the keyword of the voice and the wakeup word and a second similarity between the keyword of the voice and the similar word of the wakeup word, and activate the voice command recognition mode if it is identified that the first similarity is higher than the second similarity.

4. The electronic device as claimed in claim 1, wherein the at least one processor is further configured to:
store a noise extraction algorithm for performing noise filtering and echo canceling,
extract a noise of the digital signal using the noise extraction algorithm, and
then identify whether the characteristic value of the digital signal from which the noise is extracted is equal to or higher than the predetermined threshold level.

5. The electronic device as claimed in claim 1, further comprising a display,
wherein the at least one processor is further configured to:
provide a UI for at least one of registration and edition of the wakeup word through the display, and
store a text input through the UI as the wakeup word.

6. The electronic device as claimed in claim 5, wherein the at least one processor is further configured to automatically create and store a similar word of the updated wakeup word on the basis of at least one of a user's speech history and an external data server if the wakeup word is updated.

7. The electronic device as claimed in claim 1, further comprising a sensor configured to sense a user,
wherein the at least one processor is further configured to:
identify that the digital signal includes the voice if it is identified that the user is sensed on the basis of the sensing result received from the sensor, and
activate the voice command recognition mode if the keyword of the voice included in the digital signal coincides with the wakeup word.

8. The electronic device as claimed in claim 7, wherein the at least one processor is further configured to control the predetermined threshold level based on whether the user is sensed on the basis of the sensing result received from the sensor.

9. A method for controlling an electronic device including a storage storing a wakeup word for entering into a voice command recognition mode and at least one processor, comprising:
sensing a sound signal;
converting the sensed sound signal into a digital signal;
identifying whether a characteristic value of the digital signal is equal to or higher than a predetermined threshold level if the digital signal is received, the characteristic value of the digital signal being identified on the basis of an average frequency and an average decibel of the digital signal;
performing voice recognition for the digital signal if the characteristic value of the digital signal is equal to or higher than the predetermined threshold level; and
activating the voice command recognition mode if a keyword of a voice included in the digital signal coincides with the wakeup word.

10. The method as claimed in claim 9,
wherein the characteristic value of the digital signal is further identified on the basis of a length of the sound signal, and
wherein the predetermined threshold level is a level that is set to identify whether the digital signal includes the voice.

11. The method as claimed in claim 9, wherein the activating of the voice command recognition mode comprises:
storing at least one similar word of the wakeup word,
identifying first similarity between the keyword of the voice and the wakeup word and second similarity between the keyword of the voice and the similar word of the wakeup word, and
activating the voice command recognition mode if it is identified that the first similarity is higher than the second similarity.

12. The method as claimed in claim 9, wherein the activating of the voice command recognition mode comprises:
storing a noise extraction algorithm for performing noise filtering and echo canceling,
extracting a noise of the digital signal using the noise extraction algorithm, and
then identifying whether the characteristic value of the digital signal from which the noise is extracted is equal to or higher than the predetermined threshold level.

13. The method as claimed in claim 9, further comprising:
providing a UI for at least one of registration and edition of the wakeup word; and
storing a text input through the UI as the wakeup word.

14. The method as claimed in claim 9, further comprising automatically creating and storing a similar word of the updated wakeup word on the basis of at least one of a user's speech history and an external data server if the wakeup word is updated.

15. The method as claimed in claim 9, wherein the activating of the voice command recognition mode comprises:
identifying that the digital signal includes the voice if it is identified that the user is sensed on the basis of the sensing result received from a sensor, and
activating the voice command recognition mode if the keyword of the voice included in the digital signal coincides with the wakeup word.

16. The method as claimed in claim 15, further comprising controlling the predetermined threshold level based on whether the user is sensed on the basis of the sensing result received from the sensor.

17. An electronic device comprising:
a storage configured to store a wakeup word for entering into a voice command recognition mode and at least one similar word of the wakeup word;
a sensor; and
at least one processor configured to:
convert a sound signal sensed through the sensor into a digital signal,
identify whether a characteristic value of the digital signal is equal to or higher than a predetermined threshold level if the digital signal is received, the characteristic value of the digital signal being identified on the basis of an average frequency and an average decibel of the digital signal,
perform voice recognition for the digital signal if the characteristic value of the digital signal is equal to or higher than the predetermined threshold level,
identify a first similarity between a keyword of a voice included in the digital signal and the wakeup word and a second similarity between the keyword of the voice and a similar word of the wakeup word, and
activate the voice command recognition mode if it is identified that the first similarity is higher than the second similarity.

18. The electronic device as claimed in claim 17, further comprising:
a display,
wherein the at least one processor is further configured to:
provide a UI for at least one of registration and edition of the wakeup word through the display, and
store a text input through the UI as the wakeup word.

19. The electronic device as claimed in claim 17, wherein the at least one processor is further configured to automatically create and store a similar word of the updated wakeup word on the basis of at least one of a user's speech history and data received from an external data server.

\* \* \* \* \*